United States Patent [19]

Yaguchi

[11] Patent Number: 5,239,029
[45] Date of Patent: Aug. 24, 1993

[54] CURABLE RESIN COMPOSITIONS

[75] Inventor: Atsunori Yaguchi, Sodegaura, Japan

[73] Assignee: Idemitsu Petrochemical Company Limited, Tokyo, Japan

[21] Appl. No.: 432,647

[22] Filed: Nov. 7, 1989

[30] Foreign Application Priority Data

Nov. 8, 1988 [JP] Japan .................... 63-282207

[51] Int. Cl.⁵ .......................................... C08F 230/02
[52] U.S. Cl. ..................................... 526/276; 526/274
[58] Field of Search ............................. 526/276, 274

[56] References Cited

U.S. PATENT DOCUMENTS 4,661,065  4/1987  Gettleman et al. ............. 433/168.1
5,047,270  9/1991  Mori et al. ..................... 428/35.2

FOREIGN PATENT DOCUMENTS 0008794   3/1980  European Pat. Off. .
59-2449   1/1984  Japan .
61-47406  3/1986  Japan .
63-241075 10/1988 Japan .

*Primary Examiner*—Paul R. Michl
*Assistant Examiner*—Edward Cain
*Attorney, Agent, or Firm*—Browdy and Neimark

[57]  ABSTRACT

A curable resin composition is a blend of a curable phosphazene compound with a pentaerythritol acrylate compound and/or a bis(4-acryloxydialkoxyphenyl)alkane compound in a ratio of the former to the latter ranging from 90 to 10 to 5 to 95. The curable resin composition is provided with excellent properties such as a surface hardness, transparency and so on, and it can be cured at an improved curing rate.

14 Claims, No Drawings

CURABLE RESIN COMPOSITIONS

BACKGROUND OF THE INVENTION

1. Field of the Invention

The present invention relates to a curable resin composition and, more particularly, to a curable resin composition which is provided with excellent properties such as curing rate, surface hardness, transparency and so on, in a balanced manner and which is capable of lending itself favorably and extensively to materials for forming a back coating layer, for example, of ink ribbons, materials for forming protective layers for various cards, films, molded or formed products and so on, coating materials of various optical devices and instruments, binders of various optical devices and instruments, binders for magnetic materials, and so on.

2. Description of Related Art

Curable resins and curable resin compositions are cured readily, for example, upon exposure to heat rays or activation energy rays so that they are used in wide fields for various coating materials, materials for forming protective layers, curing filler compounds, and so on.

In particular, curable phosphazene compounds are recognized for their utility because they are good in mechanical properties such as surface hardness, resistance to heat, and so on. For example, Japanese Patent Publication (kokoku) No. 2,449/1984 and Japanese Patent Publication (kokai) No. 241,075/1988 disclose methods for preparing curable phosphazene compound and reaction-curing coating materials.

Furthermore, Japanese Patent Publication (kokai) No. 47,406/1986 discloses curable resin compositions comprising a polymerizable phosphazene compound and a mixture of the said phosphazene compound with a polymerizable monomer such as 2,2'-bis(acryloxydiphenyl)propane, 2,2'-bis[4-(3-methacryloxy)-2-hydroxypropoxyphenyl]propane.

The curable resin compositions, however, have a limited utility for dental restoring materials and dental filler compounds. They are provided with improved mechanical strength and adhesion, but there is still left room for improvements in properties such as a curing rate and a degree of transparency.

Generally speaking, conventional curable resins and curable resin compositions can be said to be still insufficient in properties such as a curing rate, surface hardness, transparency, cure shrinkage and so on and, furthermore, they are not said to have their properties harmonized in a balanced fashion.

SUMMARY OF THE INVENTION

Therefore, the present invention has the object to provide a curable resin composition which is excellent in properties such as curing rate, surface hardness, degree of transparency and so on and further which is provided with remarkable improvements in these properties in a harmonious manner.

As a result of extensive studies, it has been found that a curable resin composition consisting of a blend of a curable phosphazene compound with a particular compound is excellent in various properties such as a curing rate, surface hardness, transparency and so on, and that the properties are balanced in a favorable way.

In order to achieve the object, the present invention consists of a curable resin composition comprising a blend of a curable phosphazene compound with a pentaerythritol acrylate compound and/or a bis(4-acryloxydialkoxyphenyl)alkane compound.

DESCRIPTION OF THE PREFERRED EMBODIMENTS

In accordance with the present invention, the curable phosphazene compound may be represented by the following general formula (I):

$$\{NP(X)_p(Y)_q\}_n \qquad (I)$$

(wherein

X and Y are identical to or different from and independently each a polymerization curable group or a non-polymerization curable group, provided however that at least one of X and Y is a polymerization curable group;

p and q are independently each 0 or an integer larger than 0, provided however that the sum of p and q is 2; and n is an integer of 3 or larger).

In the general formula (I), the polymerization curable group referred to by the reference symbol X and Y is not restricted to any particular group as long as the group is provided with an unsaturated linkage polymerizable with heating or upon exposure to ultraviolet rays, electron rays or the like and may include a group containing, for example, an acryl group, a methacryl group, a vinyl group, an allyl group and so on. Preferred are an acryloyloxy group and a methacryloyloxy group from the viewpoint of a curing rate.

In the general formula (I), the non-polymerization curable group referred to by the reference symbol X and Y may include, for example, hydrogen atom, a halogen atom, a phenoxy group, a halogenated phenoxy group, an alkoxy group, a halogenated alkoxy group, an amino group, an alkyl-amino group, a halogenated alkylamino group, a mercapto group or the like.

In order to improve a water resistance, an abrasion resistance, a water repellency and so on, there may be introduced, as a non-polymerization group, a fluorine-containing group as represented by the following general formula:

$$-OCH_2(CF_2)_mZ^1$$

(wherein m is an integer from 1 to 4; and $Z^1$ is hydrogen atom or fluorine atom)

or as represented by the following general formula:

$$-OCH(CF_3)_2$$

A fluoride capable of introducing the fluorine-containing group may include, for example, 2,2,2-trifluoroethanol, 2,2,3,3,3-pentafluoro-1-propanol, 2,2,3,3,4,4,4-heptafluoro-1-butanol, 2,2,3,3-tetrafluoro-1-propanol, 2,2,3,3,4,4,5,5-octafluoro-1-pentanol, and 1,1,1,3,3,3-hexafluoro-2-propanol.

Where an adhesion is required in using the curable resin composition, there may be introduced, for example, a group derived from a saturated carboxylic acid as represented by the following general formula:

$$-O(CH_2)_{n_1}COOH \text{ (where } n_1 = 1 \text{ to 15);}$$

a group derived from a carbocyclic carboxylic acid as represented by the following general formulas:

—OC$_6$H$_4$(CH$_2$)$_{n2}$COOH (where n$_2$=0, 1 or 2);ps
—OC$_6$H$_3$(COOH)$_2$; or —OC$_6$H$_3$R'COOH (where R'=OH or OCH$_3$).

The saturated carboxylic acid may include, for example, hydroxyacetic acid, 4-hydroxybutyric acid, β-hydroxypropionic acid, and so on.

The carbocyclic carboxylic acid may include, for example, p-hydroxybenzoic acid, p-hydroxyphenylacetic acid, p-hydroxyphenylpropionic acid, 4-hydroxyphthalic acid, 2,3-dihydroxybenzoic acid, 4-hydroxy-3-methoxybenzoic acid, and so on.

In accordance with the present invention, the group represented by the reference symbols X and/or Y in the general formula (I) above is preferably a group as represented by the following general formula (II):

(wherein
R is an alkylene group having from 1 to 12 carbon atoms; and
Z is hydrogen atom or methyl group).

In the general formula (II), the alkylene group referred to by the reference symbol R may include a linear or branched alkylene group, and ethylene group is a preferred alkylene group.

Representative examples of the groups represented by the general formula (II) above may include, for example, a residue (hereinafter referred to sometimes as a methacrylate residue) obtainable by removing hydrogen atom from the hydroxy group of a methacrylate, such as 2-hydroxyethyl methacrylate, 2-hydroxypropyl methacrylate, 2-hydroxybutyl methacrylate, 3-hydroxybutyl methacrylate, 4-hydroxybutyl methacrylate, 5-hydroxypentyl methacrylate, 6-hydroxy-3-methylhexyl methacrylate, 5-hydroxyhexyl methacrylate, 3-hydroxy-2-t-butylpropyl methacrylate, 3-hydroxy-2,2-dimethylhexyl methacrylate, 3-hydroxy-2-methylethylpropyl methacrylate and 12-hydroxydodecyl methacrylate; and a residue (hereinafter referred to sometimes as an acrylate residue) obtainable by removing hydrogen atom from the hydroxy group of an acrylate, such as 2-hydroxylethyl acrylate, 2-hydroxypropyl acrylate, 2-hydroxybutyl acrylate, 3-hydroxybutyl acrylate, 4-hydroxybutyl acrylate, 5-hydroxypentyl acrylate, 6-hydroxy-3-methylhexyl acrylate, 5-hydroxyhexyl acrylate, 3-hydroxy-2-t-butylpropyl acrylate, 3-hydroxy-2,2-dimethylhexyl acrylate, 3-hydroxy-2-methylethylpropyl acrylate and 12-hydroxydodecyl acrylate. Preferred are 2-hydroxylethyl methacrylate residue and 2-hydroxylethyl acrylate residue.

As a residue of comparison of a hydroxylalkyl methacrylate residue with a hydroxylalkyl acrylate residue, as have been illustrated hereinabove, the hydroxylalkyl acrylate residue is more preferred in terms of a curing rate.

The curable phosphazene compounds as represented by the general formula (I) above may be one in which reference symbol n is an integer of 3 or greater, preferably from 3 to 18, and, more preferably, a cyclic compound in which n is 3 or 4 or a mixture thereof.

The curable phosphazene compounds may be prepared by per se known processes.

For instance, a reaction of hexachloro cyclotriphosphazene with 2-hydroxyethyl methacrylate yields a phosphazene compound in which a portion or all of chlorine atoms of the hexachlorocyclotriphosphazene is substituted by the 2-hydroxylethyl methacrylate residue. In this case, it is preferred that all the chlorine atoms are substituted although it is possible that a portion of the chlorine atoms is left unsubstituted.

In this reaction, it is advantageous to use a tertiary amine because it can facilitate a reaction of removing hydrogen chloride. Such a tertiary amine may include, for example, trimethyl amine, triethyl amine, triisopropyl amine, tri-n-propyl amine, tri-n-butyl amine and pyridine. Preferred is pyridine.

The reaction may be carried out usually in an organic solvent which may include, for example, benzene, toluene, xylene, chloroform, cyclohexane, methylene chloride or tetrahydrofuran or a mixture thereof.

The chlorophosphazene compound to be used as a starting material for the preparation of the phosphazene compound in accordance with the present invention may preferably include, for example, a trimer of dichlorophosphazene, i.e., hexachlorocyclotriphosphazene, teromer thereof, i.e., octachlorocyclotetraphosphazene, or an oligomer thereof, because the phosphazene compound obtained by using the trimer, teromer or oligomer thereof can readily control a cross-linkage density in a coat (obtainable by curing the phosphazene compound).

The curable resin composition according to the present invention contains the pentaerythritol acrylate compound and/or the bis(4-acryloxydialkoxyphenyl)alkane compound, on top of the curable phosphazene compound as have been described hereinabove.

As the pentaerythritol acrylate compounds, there may be enumerated, for example, pentaerythritol triacrylate, also known as pentaerythritol monohydroxy triacrylate; dipentaerythritol hexaacrylate, dipentaerythritol pentaacrylate, also known as dipentaerythritol monohydroxypentaacrylate, and so on. Among these compounds, pentaerythritol triacrylate which is unsaturated, dipentaerythritol hexaacrylate which is saturated, and dipentaerythritol monohydroxypentaacrylate which is unsaturated, are preferred. The pentaerythritol acrylate compound may be used singly or in combination thereof.

The pentaerythritol acrylate compound may be obtained, for example, by reacting pentaerithritol with acrylic acid.

Furthermore, among these pentaerythritol acrylate compounds, it is preferred to use a mixture of the dipentaerythritol hexaacrylate containing 30 to 50% in mole of dipentaerythritol monohydroxypentaacrylate that is readily available, in terms of curability and so on.

As a preferred example of the bis(4-acryloxydialkoxyphenyl)alkane compound may be mentioned a compound as represented by the following general formula (III):

(III)

(wherein
- $R^1$ is methylene group, ethylene group or propylene group;
- $R^2$, $R^3$, and $R^4$ are identical to or different from each other and are independently each hydrogen atom or an alkyl group having from 1 to 6 carbon atoms; and
- a and b are each an integer from 1 to 3).

More specifically, the bis(4-acryloxydialkoxyphenyl)alkane compounds as represented by the general formula (III) may include, for example, 2,2'-bis(4-acryloxydimethoxyphenyl)methane, 2,2'-bis(4-acryloxydiethoxyphenyl)methane, 2,2'-bis(4-acryloxydipropoxyphenyl)methane, 2,2'-bis(4-acryloxydimethoxyphenyl)ethane, 2,2'-bis(4acryloxydiethoxyphenyl)ethane, 2,2'-bis(4-acryloxydipropoxyphenyl)ethane, 2,2,'-bis(4-acryloxydimethoxyphenyl)propane, 2,2'-bis(4-acryloxydiethoxyphenyl)propane, 2,2'-bis(4-acryloxydipropoxyphenyl)propane, 2,2'-bis(4-acryloxydimethoxyphenyl)butane, 2,2'-bis(4-acryloxydiethoxyphenyl)butane, 2,2'-bis(4-acryloxydipropoxyphenyl)butane, and so on. Among these compounds, preferred is a compound having a bis(4-acryloxydialkoxyphenyl)propane structure.

The curable phosphazene compound (hereinafter referred to sometimes as "component A") may be blended with the pentaerythritol acrylate compound and/or the bis(4-acryloxydialkoxyphenyl)alkane compound (hereinafter the two compounds being generally or individually referred to sometimes as "component B") in a ratio in weight of the component A to the component B ranging from 90:10 to 5:95, preferably from 85:15 to 10:90, more preferably from 80:20 to 20:80, particularly preferably from 75:25 to 30:70. The composition containing a too small amount of the component A may decrease a mechanical strength of a cured product obtainable from the resin composition while using a too great amount of the component A may not improve a curing rate to a sufficient level as expected.

The curable resin compositions according to the present invention may contain a curing agent on top of the component A and the component B.

When the curable resin compositions according to the present invention is cured upon exposure, for example, to ultraviolet rays or visible rays, the curing agent to be preferably used may include, for example, a photopolymerization initiator such as 1-hydroxycyclohexylphenyl ketone, dibenzoyl, benzoyl methyl ether, benzoyl ethyl ether, p-chlorobenzophenone, p-methoxybenzophenone, benzoyl peroxide, di-tert.-butyl peroxide and camphaquinone. These curing agents may be used singly or in combination thereof. They may be used in an amount ranging usually from 0.05 parts to 10.0 parts by weight with respect to 100 parts by weight of the curable resin composition.

When the curable resin composition according to the present invention is cured by heating at elevated temperatures or cured at ambient temperatures, it is preferred to use a peroxide compound, an amine compound or a mixture thereof as a polymerization initiator. As representative examples of the peroxide compounds, there may be enumerated, for example, benzoyl peroxide, P-chlorobenzoyl peroxide, 2,4-dichlorobenzoyl peroxide, t-butyl hydroperoxide, di-t-butyl peroxide, dicumyl peroxide, t-butyl peroxyacetate, diacetate, t-butyl peroxybenzoate and so on. As representative examples of the amine compounds may be enumerated, for example, N,N-diethanol-p-toluidine, dimethyl-p-toluidine, p-toluidine, methyl amine, t-butyl amine, methylethyl amine, diphenyl amine, 4,4'-dinitrodiphenyl amine, o-nitroaniline, p-bromoaniline, 2,4,6-tribromoaniline and so on. They may be used singly or in combination thereof and in an amount ranging usually from 0.05 parts to 10.0 parts by weight, preferably from 0.01 to 6.0 parts by weight, with respect to 100 parts by weight of the curable resin composition.

The curable resin compositions according to the present invention may further contain, if necessary, an additive such as a sensitizer, a leveling agent, an antistatic agent or the like, in addition to the components A and B as well as the curing agent to be added as needed.

The curable resin compositions according to the present invention may be cured after they are coated on an appropriate substrate. Materials for the substrate are not restricted to a particular one and may include, for example, polyester, polystyrene, acrylic resin, polycarbonate, polyurethane, polyethylene, polypropylene, polyamide resin, vinyl chloride resin, vinylidene chloride resin, polyalkylene terephthalate, polyarylate, polyarylene sulfide and so on and a resin composition containing these resins as a resinous ingredient as well as composite materials blended with fibers reinforced materials, inorganic fillers or the like, metal, ceramic, glass, wood and so on. Among these materials, thermoplastic resin having a relatively high resistance to heat, such as polyesters, polycarbonates, polyamide resins and so on are preferred when the resins are used as such materials. A shape of the substrate is not restricted to a particular one and it may be of a mono-layer or poly-layer film or sheet or of a type of molded or formed products.

The curable resin compositions according to the present invention may be coated on the substrate by a variety of per se known procedures such as by the spinner method, spraying method, roll coater method, dipping method or the like.

In coating the curable resin compositions according to the present invention on the substrate, a diluent may be used in order to improve workability.

The diluent may include, for example, an organic solvent such as ketone, e.g., methylethyl ketone, methylisobutyl ketone, cyclohexanone or the like, an aromatic hydrocarbon, e.g., benzene, toluene, xylene or the like, a halogenated hydrocarbon, e.g., chloroform, methylene chloride or the like, an alcohol, e.g., methanol, ethanol, propanol, butanol or the like, an ether, e.g., tetrahydrofuran, dioxane or the like; or a cellosolve such as ethyl cellosolve, butylcellosolve. The diluent may be used singly or in admixture with the other diluent or diluents. Among these diluents, ketones, alcohols or a mixture thereof are preferred, and particularly methylisobutyl ketone or a mixed solvent containing isopropyl alcohol or butyl alcohol may be conveniently used.

Although the amount of the diluent is not restricted to a particular range with respect to the curable resin composition according to the present invention, a ratio in weight of the diluent to the curable resin composition may range usually from 1:9 to 9:1 and it is preferred in terms of workability that the ratio is chosen from the range from 9:1 to 5:5.

The curable resin composition according to the present invention may be cured by any per se known procedures such as by curing method at an ambient temperature or at an elevated temperature, by exposure to electron rays, ultraviolet rays, X-ray, $\gamma$-ray or visible rays, and so on. When ultraviolet rays are used, it is preferred to expose the ultraviolet rays having wavelengths in the range of from 200 to 550 nm for a period of time of 0.1 second or longer, preferably ranging from 0.5 to 60 seconds. An integrated quantity of light exposed may range usually from 30 to 5,000 mj/cm$^2$.

A cured coat obtained by curing the curable resin composition according to the present invention has been found to be provided with excellent surface hardness and transparency in a well balanced fashion, thereby enabling a remarkable improvement in surface properties of the substrate. It is further found that the curable resin composition according to the present invention can be cured at a remarkably improved curing rate.

It is to be noted that the curable resin composition according to the present invention can provide a cured coat with excellent properties in a desired manner without carrying any surface treatment or without undercoating a primer and with coating by one stage as well. A film thickness of the cured coat may range usually from 0.01 to 1,000 $\mu$m, preferably from 0.05 to 200 $\mu$m. If the film thickness of the cured coat is thinner than the lower limit, no mechanical strength such as a surface hardness may be achieved. If the cured coat has a film thickness thicker than the upper limit, a flexibility of the substrate in itself may be eliminated.

The curable resin composition according to the present invention having the composition and structure as have been described hereinabove are conveniently used for materials for forming a back coating of ink ribbons and so on, materials for forming a protective film for various cards, films and other molded or formed products, coating materials for various optical instruments and devices, binders for magnetic materials, and so on. It also may be advantageously used for window materials formed by acrylic resins, polycarbonates, glass or the like, coating materials for light transmitting materials for luminaires, ornaments and so on, coating agents for wooden materials, plywood boards, smoothly planed plywood boards, furniture and so on, dental filler compound, impregnating agents for fibers and so on, coating materials for mechanical, electrical and electronic parts and so on. Furthermore, it may be used for various formed materials, wooden materials, plywood boards, furniture and so on as materials for forming an outermost surface coat on a coated layer resulting from polyurethanes, acrylic resins and so on.

PREPARATION EXAMPLE 1

Preparation of Curable Phosphazene Compound

A 1-liter flask equipped with a thermometer, a stirrer, a dropping funnel and a condenser was charged with 58.0 g (0.167 mole) of hexachlorotriphosphazene (hereinafter referred to as 3PNC), 50 ml of toluene and 158 g (2.0 moles) of pyridine, and the mixture was stirred.

To the mixture was dropwise added 143 g (1.1 moles) of 2-hydroxyethyl methacrylate (hereinafter referred to as HEMA) through the dropping funnel. The mixture was heated to 60° C. in a water bath and the reaction was continued for 8 hours with stirring. After precipitated crystalline materials were filtered off and the solvent in the filtrate was distilled off under reduced pressures. The residual solution was dried to a sufficient level, leaving 136 g (yield: 91%) a curable phosphazene compound (A) in the form of a solution having a yellow color.

PREPARATION OF EXAMPLE 2

Preparation of Curable Phosphazene Compound

A 1-liter flask equipped with a thermometer, a stirrer, a dropping funnel and a condenser was charged with 100 ml of tetrahydrofuran and 11.6 g (0.5 mole) of metal sodium. To this mixture was dropwise added 55.5 g (0.55 mole) of 2,2,2-trifluoroethanol, and the mixture has been then reacted under reflux until the sodium was completely lost. To this reaction mixture was dropwise added a solution of 39.6 g (0.111 mole) of 3PNC in 100 ml of toluene, and the mixture was reacted under reflux for 2 hours. Thereafter, the temperature of the reaction mixture was dropped to room temperature and 191 g (1.47 mole) of HEMA was dropwise added to the reaction mixture slowly using the dropping funnel. The mixture was then heated to 60° C. in a water bath and the reaction was continued for 8 hours at that temperature with stirring. After precipitated crystalline materials and the catalyst were filtered off and the solvent in the filtrate was distilled off under reduced pressures. The residual solution was dried to a sufficient level, leaving 88 g (yield: 93%) a curable phosphazene compound (B) in the form of solution having a yellow color.

EXAMPLE 1

Using the curable phosphazene compound (A) obtained in Preparation Example 1, a reaction curable coating material (A) was prepared so as to have the following composition:

| Composition | Amount |
| --- | --- |
| Curable phosphazene compound (A) | 30 g |
| Dipentaerythritol hexaacrylate-dipentaerythritol monohydroxy-pentaacrylate (40 mol % mixture) ("DPHA", Nippon Kayaku KK) | 20 g |
| Isopropyl alcohol | 20 g |
| Methylisobutyl ketone | 30 g |
| Butanol | 20 g |
| 1-Hydroxycyclohexylphenyl ketone (photopolymerization initiator) | 1 g |

For the reaction curable coating material (A), a cure shrinkage was given in the following way:

A test sample was prepared by adding benzophenone at the rate of 5% by weight with respect to the weight of solid materials of the reaction curable coating material (A) and exposing the resulting mixture to ultraviolet rays, the cure shrinkage was calculated on the basis of a density before curing, $C_A$ (a value obtained by measurement by the Harvard specific gravity bottle method) and a density after curing, $C_B$ (a value obtained by measurement by a specific gravity meter) by the following formula:

Cure Shrinkage (%) = $[1-(C_B/C_A)] \times 100$

The result is shown in Table 1 below.

The reaction curable coating material (A) was then sprayed on a polyester sheet to form a coat having a film thickness of 8 μm, which in turn was dried and exposed to ultraviolet rays in the intensity of 90 mj/cm² yielding a cured coat.

The resulting cured coat was measured for a minimum quantity of light required for curing, surface hardness, pencil hardness, and light transmittance. The results are shown in Table 1 below.

Instruments and methods used for tests were as follows:

| | |
|---|---|
| UV curing tester: | Model UB 031-5A (EyE GRAPHICS CO.) Model UV-350 (ORC SEISAKUSHO CO.) |
| Surface hardness: | Taber abrasion tester: Model CS-10; 500 g, 100 r.p.m. |
| Pencil hardness: | 9H: No scratch formed by rubbing with a pencil 9H; 8H: No scratch formed by rubbing with a pencil 8H yet a scratch formed by rubbing with a pencil H; H: No scratch formed by rubbing with a pencil H yet a scratch formed by rubbing with a pencil 2H. |
| Light transmittance: | according to JIS K-7105 |

EXAMPLE 2

A reaction curable coating material (II) was prepared in the same manner as in Example 1 with the exception that, in place of the curable phosphazene compound (A), the curable phosphazene compound (B) obtained in Preparation Example 2 was used.

The results are shown in Table 1 below.

EXAMPLE 3

Using the curable phosphazene compound (A) obtained in Preparation Example 1 and a commercially available curable resin [2,2'-bis(4-acryloxydiethoxyphenyl)propane: "R-551": Nippon Kayaku K.K.], a reaction curable coating material (C) was prepared so as to have the following composition:

| Composition | Amount |
|---|---|
| Curable phosphazene compound (A) | 30 g |
| 2,2'-Bis(4-acryloxydiethoxyphenyl)-propane | 20 g |
| Isopropyl alcohol | 20 g |
| Methylisobutyl ketone | 30 g |
| Butanol | 20 g |
| 1-Hydroxycyclohexylphenyl ketone (photopolymerization initiator) | 1 g |

The resulting reaction curable coating material (C) were then treated in the same manner as in Example 1 with the exception that the coating material (C) was used in place of the coating material (A) above.

The results are shown in Table 1 below.

COMPARATIVE EXAMPLE 1

A reaction curable coating material (D) as prepared using the curable phosphazene compound (A) so as to provide the following composition:

| Composition | Amount |
|---|---|
| Curable phosphazene compound (A) | 50 g |
| Isopropyl alcohol | 20 g |
| Methylisobutyl ketone | 30 g |
| Butanol | 20 g |
| 1-Hydroxycyclohexylphenyl ketone (photopolymerization initiator) | 1 g |

The resulting reaction-curable coating material (D) was measured for its cure shrinkage in the same manner as in Example. The result is shown in Table 1 below.

The reaction-curable coating material (D) was then sprayed on a polyester sheet to form a coat having a film thickness of 8 μm, which was then dried and cured by exposure to ultraviolet rays in the intensity of 250 mj/cm².

The resulting cured coat was measured for a minimum quantity of light required for curing, surface hardness, pencil hardness, and light transmittance. The results are shown in Table 1 below.

COMPARATIVE EXAMPLE 2

A reaction curable coating material (E) was prepared using the curable phosphazene compound (A) and trimethylol propane triacrylate so as to provide the following composition:

| Composition | Amount |
|---|---|
| Curable phosphazene compound (A) | 30 g |
| Trimethylol propane triacrylate | 20 g |
| Isopropyl alcohol | 20 g |
| Methylisobutyl ketone | 30 g |
| Butanol | 20 g |
| 1-Hydroxycyclohexylphenyl ketone (photopolymerization initiator) | 1 g |

The resulting reaction-curable coating material (E) was measured for its cure shrinkage in the same manner as in Example 1 above. The result is shown in Table 1 below.

The reaction-curable coating material (E) was then sprayed to form a coat in the same manner as in Example 1 above.

The resulting cured coat was measured for a minimum quantity of light required for curing, surface hardness, pencil hardness, and light transmittance. The results are shown in Table 1 below.

TABLE 1

| Test Items | Examples | | | Comparative Examples | |
|---|---|---|---|---|---|
| | 1 | 2 | 3 | 1 | 2 |
| Cure Shrinkage (%) | 6.5 | 7.8 | 7.2 | 4.6 | 4.5 |
| Minimum Quantity of Light (mj/cm²) required for Curing (mg/cm²) | 90 | 90 | 90 | 250 | 140 |
| Surface Hardness Δ H | 7.8 | 6.3 | 8.3 | 7.2 | 35.8 |
| Pencil Hardness | 9H | 8-9H | 8H | 9H | H |
| Light Transmittance (%) | 92.2 | 91.3 | 90.2 | 90.4 | 90.6 |

As is apparent from the test results as shown in Table 1 above, it is found that the curable resin composition according to the present invention as illustrated in Examples above are superior in the minimum quantity of light required for curing, surface hardness, pencil hardness, and light transmittance in comparison with the curable resin compositions as illustrated in Comparative Examples above and that their properties are balanced in a well harmonious manner.

EXAMPLE 4

The reaction-curable coating material (A) was coated with Bar Coater (#20) separately on a polycarbonate plate and on an acrylic resin plate, each having a plate thickness of 3 mm, to form a coat which, in turn, was dried to remove the solvent contained therein and then cured upon exposure to ultraviolet rays in the intensity of 100 mj/cm$^2$.

Each of the resulting cured coats was evaluated with its abrasion resistance in terms of a degree of reduction in haze. The results are shown in Table 2 below.

TABLE 2

|  | Polycarbonate Plate | Acrylic Resin Plate |
| --- | --- | --- |
| Taber Abrasion *1) | 13 (36) | 12 (33) |
| Falling Sand Abrasion *2) | 24 (70) | 22 (72) |

Notes:
*1) Abrading Ring CS-10: load, 500 g; 100 r.p.m.
*2) Carborundum #60: 1,000 g
( ): Representing a non-coated material

EXAMPLE 5

A reaction-curable coating material was prepared in the same manner as in Example 1 with the exception that, in place of 1 g of 1-hydroxycyclohexylphenyl ketone as a photopolymerization initiator, there were used 0.2 g of cumen hydroperoxide and 0.4 g of dithiourea.

The resulting reaction-curable coating material was then coated on a plywood board by dipping to form a coat which in turn was cured in vacuo at 40° C. for 2 hours and at 60° C. for 5 hours. The resulting cured coat surface was rubbed with steel wool with no scratches.

As have been described hereinabove, by selectively blending the curable phosphazene compound with the pentaerythritol acrylate compound and/or the bis(4-acryloxydialkoxyphenyl)alkane compound, the present invention provides the industrially useful curable resin composition which demonstrates excellent properties such as a surface hardness, transparency, abrasion resistance, adhesion to a substrate, and so on, without causing any reduction in the properties inherent in the curable phosphazene compound. The curable resin composition can be further cured at a significantly improved curing rate thereby improving a productivity of cured products which are suitable for various uses because of their balanced properties.

What is claimed is:

1. A curable resin composition comprising a curable phosphazene compound and an ingredient selected from the group consisting of an unsaturated pentaerythritol acrylate compound and a bis(4-acryloxydialkoxyphenyl)propane.

2. A curable resin composition as claimed in claim 1, wherein the bis(4-acryloxydialkoxyphenyl)propane is represented by the formula:

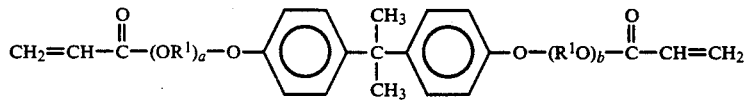

wherein R$^1$ is a methylene group, ethylene group or propylene group.

3. A curable resin composition as claimed in claim 1, wherein the curable phosphazene compound is blended with the pentaerythritol acrylate compound and/or bis(4-acryloxydialkoxyphenyl)propane in a ratio of former to the latter ranging from 90:10 to 5:95.

4. A curable resin composition as claimed in claim 1, wherein the curable phosphazene compound is a compound of the formula (I):

wherein X and Y are identical to or different and independently each a polymerization curable group or a non-polymerization curable group, provided however that at least one of X and Y is a polymerization curable group provided with an unsaturated linkage polymerizable upon heating or exposure to radiation; p and q are independently each 0 or an integer larger than 0, provided however that the sum of p and q is 2; and n is an integer of 3 or 4, or a mixture of compounds of formula (I).

5. A curable resin composition as claimed in claim 4, wherein X and/or Y is a group as represented by the following general formula (II):

$$-ORO_2C-\underset{\underset{Z}{|}}{C}=CH_2 \qquad (II)$$

(wherein
R is an alkylene group having from 1 to 12 carbon atoms; and
Z is hydrogen atom or methyl group).

6. A curable resin composition as claimed in claim 4, wherein X and/or Y is a group obtainable by removing hydrogen atom from hydroxyl group of 2-hydroxylethyl methacrylate.

7. A curable resin composition according to claim 4 wherein at least one of X and Y contains an acryl group, a methacryl group, a vinyl group or an allyl group.

8. A curable resin composition according to claim 4 wherein at least one of X and Y is acryloyloxy or methacryloyloxy.

9. A curable resin composition according to claim 1 wherein the ratio of said curable phosphazene compound to said ingredient is 85:15 to 10:90.

10. A curable resin composition according to claim 1 wherein the ratio of said curable phosphazene compound to said ingredient is 80:20 to 20:80.

11. A curable resin composition according to claim 1 wherein the ratio of said curable phosphazene compound to said ingredient is 75:25 to 30:70.

12. A curable resin composition in accordance with claim 1, wherein said ingredient is pentaerythritol monohydroxytriacrylate or dipentaerythritol monohydroxypentaacrylate.

13. A curable resin composition according to claim 1, further comprising a saturated pentaerythritol acrylate compound.

14. A curable resin composition according to claim 1, wherein said ingredient is selected from the group consisting of a bis(4-acryloxydialkoxyphenyl) propane, pentaerythritol triacrylate, dipentaerythritol monohydroxypentaacrylate, and a mixture of dipentaerythritol monohydroxypentaacrylate with dipentaerythritol hexaacrylate.

* * * * *